Nov. 9, 1926.

O. A. HOELLER

SPRING

Filed Sept. 3, 1925

1,606,223

Inventor
Otto A. Hoeller.
By
Attorneys

Patented Nov. 9, 1926.

1,606,223

UNITED STATES PATENT OFFICE.

OTTO A. HOELLER, OF CINCINNATI, OHIO.

SPRING.

Application filed September 3, 1925. Serial No. 54,376.

This invention relates to improvements in vehicle springs of the leaf type and particularly to the side edge of the spring or its leaves, and has for its objects the provision of lubricant receiving ledge or ledges for retaining and holding lubricant to be fed between adjacent leaves during flexing action of the leaves, as in a moving vehicle, assuring adequate lubrication of the engaging surfaces of the leaves.

It is well known that with the present form of spring, and method of lubrication, wherein the lubricant is applied laterally of superposed leaves, an improper result is obtained, due to the fact that there is nothing to hold the oil and keep the same from dripping off before it can enter between the leaves.

My invention acts to retain oil, applied laterally of the superposed leaves, in such manner that the oil can run or flow between the springs, and the invention further provides means for holding a comparatively large amount of lubricant in position to be automatically delivered between the leaves when the sliding action is set up.

Other objects and certain advantages will be more fully disclosed in the description of the drawings forming a part of this application in which.

A semi-elliptic leaf-spring has been used as illustrative of one application of my invention, but it will be understood that the invention is applicable to all leaf springs, the essential feature being that the upper surface of each spring leaf provide a ledge exposure, when a number of leaves are superposed, at one or both sides of the spring.

Figure 1:
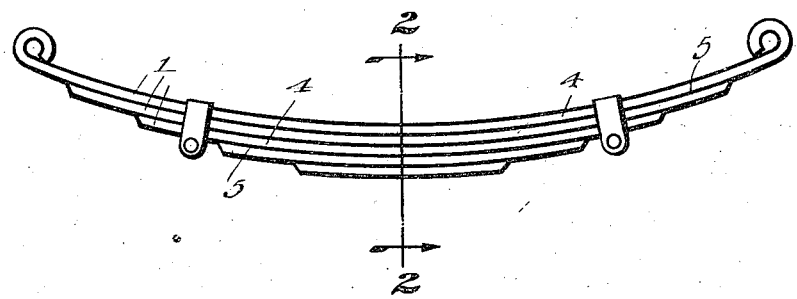
Figure 1 is a side view of one form of leaf spring illustrating the application of my invention.
Figure 2:
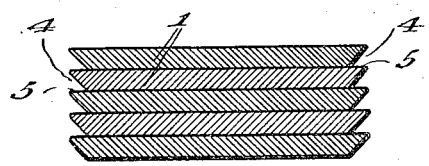
Figure 2 is a cross section on line 2—2, of Fig. 1.
Figure 3:
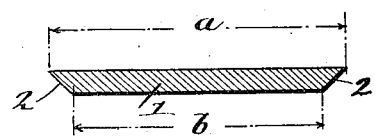
Figure 3 is a section of a single leaf.
Figure 4:
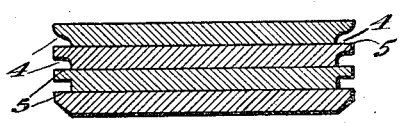
Figure 4 is a cross section through a spring showing modified forms of spring leaves.

The numeral 1 designates a spring leaf having an upper surface of the width $a$, (see Fig. 3), a lower surface of the width $b$, and inwardly inclined edges 2—2. This unequal width of top and bottom surfaces of the leaf is obtained by chamfering or inclining the opposite longitudinal edges. These inclined or chamfered faces may be curved, which would be the case if the lower corners of the lateral faces of the leaf were rounded, various types of spring leaves being illustrated in Fig. 4. Moreover the length of the inclined face may be varied, providing that a ledge of the proper width is formed, when two or more leaves are superposed.

When one or more leaves are superposed to form a leaf spring, notches 4 and ledges 5 are formed or defined, thus providing means for retaining lubricant by capillary action. Preferably the indentations or notches extend the full length of each spring and the inclined surfaces of the leaf-spring extend in opposite directions.

It will be readily understood that when oil is deposited upon any ledge it would be held from dripping by the walls of the notches, due to capillary action.

Having described my invention, I claim:

1. A spring comprising superposed leaf sections, each section having its upper surface of greater width than the lower, the unequal width of the surfaces acting to provide a ledge beneath each overlying section laterally thereof, for shelving and retaining lubricant.

2. A spring leaf section having its upper surface of greater width than the lower, whereby when a plurality of the sections are superposed to form a leaf spring, a portion of the top of each underlying spring section is exposed, forming notches and lateral ledges for shelving and retaining lubricant.

3. A spring comprising a plurality of superposed spring leaf sections of equal width, each section having its opposite ledges inclined inwardly toward the bottom face, leaving a portion of the top of each underlying leaf exposed, thus forming a lateral indentation including a ledge, laterally of the spring, beneath each overlying section and between adjacent sections for the retention of lubricant.

4. A spring leaf having its lateral edges inclined inwardly toward one face, for providing an overhanging portion, so that when a plurality of spring leaves are superposed to form a leaf spring, a notch is defined and formed between adjacent springs as well as a lateral horizontal ledge beneath each superposed spring, for retaining grease or oil applied along the sides of the leaf spring.

5. A spring leaf for vehicles, in which the width of the upper surface is greater than that of the lower surface, the surfaces symmetrically disposed with respect to one another, so that when a plurality of such spring leaves are superposed to form a leaf spring, a notch and a horizontal shelf are formed between adjacent springs, laterally and longitudinally thereof.

6. A spring comprising a plurality of superposed spring leaf sections, the sections in their superposed relation providing flat exposed portions on the upper surfaces and along the lateral edges of the spring leaves as lubricant retaining surfaces for the spring.

In witness whereof, I hereunto subscribe my name.

OTTO A. HOELLER.